3,493,305
OPTICAL TESTING DEVICE
Kenneth Michael LiDonnici, Brooklyn, N.Y., assignor, by mesne assignments, to Ing. C. Olivetti C. S.p.A., Ivrea (Torino), Italy, a corporation of Italy
Filed Oct. 24, 1966, Ser. No. 588,985
Int. Cl. G01b 9/00
U.S. Cl. 356—127                     6 Claims

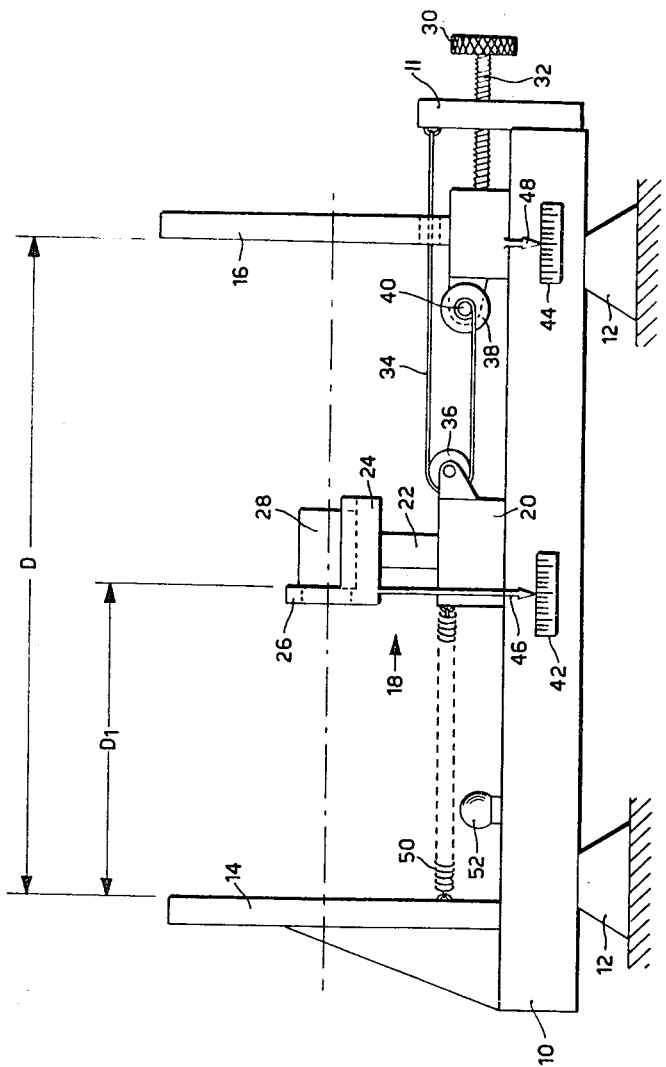

ABSTRACT OF THE DISCLOSURE

Disclosed is an optical testing device having a stationary object frame with lens support and image screen movable to calibrated positions. A first adjustment moves the lens only to obtain a one to one magnification indicating the optical center of the lens is halfway between the object and image planes. A second adjustment moves the image screen at twice the speed it moves the lens in order to obtain focus while maintaining the one to one magnification.

---

This invention relates in general to a lens-testing device and more particularly to a device for locating the optical center of a lens.

Many lenses in present day use, such as those employed in electrostatic copiers, are in fact, made up of a number of individual lenses of different configurations disposed in a barrel or sleeve. While the nominal design focal length for such a multiple lens unit may be known, the precise location of its optical center in relation to its sleeve or barrel must be determined for each individual lens unit so that it can be exactly installed in a piece of equipment and thus avoid any subsequent troublesome adjustments.

Accordingly it is the primary object of this invention to provide a method of and equipment for locating the optical center of a lens.

Additionally, other objects of the invention include evaluating the resolution capabilities of the lens and the optimum object to image distance.

Therefore, the invention provides a lens-testing device comprising a vertically extending stationary object plane mounted on a horizontally elongated base member. Also positioned on the base member in spaced relationship with the object plane are an image plane and a lens support both of which are movable. The image plane is arranged in parallel relationship with the object plane, with the lens support and its lens aligned between the two planes. First adjustment means are provided for positioning the lens support between and in alignment with the object and image planes, while second adjustment means are supplied for positioning the image plane perpendicularly to the object plane and concurrently for moving the lens support in the same direction as but only half the distance as the image plane.

Other objects and advantages of the invention will become evident from the detailed description which follows and from the accompanying drawing.

The drawing contains a somewhat diagrammatic showing of the invention and comprises an elongated horizontally arranged base member 10 having an upright blade 11 secured to its right end and resting on a pair of supports 12. Mounted vertically on the left end of the base member is a stationary object plane 14. At the opposite end of the base member and arranged in parallel relationship with the object plane is an image plane 16. Aligned between the object and image planes on the base member is a lens support 18. The dimensions of the object and image planes in the operating embodiment of this test device were eight and one-half inches by fourteen inches with the object-to-image distance ranging between thirty and three-quarters to thirty-two inches.

The lens support 18 is made up of a pedestal 20, a post 22 and a V-block 24 having a locating plate 26 at its end facing the object plane. A lens 28 disposed in a barrel is positioned in the V-block so that its left end, as seen in the drawing, bears against the right hand face of the locating plate and is aligned with an opening through the locating plate. As mentioned previously the lens is usually made up of a number of separate lenses specifically arranged in the barrel to provide a particular focal length and to overcome various aberrations which might be present in any one of its lenses.

Both the image plane 16 and the lens support 18 are movable along the base member perpendicular to the object plane 14. An adjustment knob 30 is mounted on the base member and is connected by a threaded shaft 32 to the image plane for varying the object-to-image distance. Additionally the image plane and the lens support are linked together by means of a cable 34 and pulley 36 device. The pulley 36 is attached to the lens support 18 and the cable passes over the pulley and is fastened at one end to the plate 11 of the base member and ats its opposite end to the bottom of the image plane. Mounted on the image plane 16 is another adjustment knob 38 which engages the cable 34 by means of a shaft 40 connected to the knob, preferably the cable 34 is anchored to the shaft 40 in the fashion of a winch.

Located on the base member are two scales 42, 44, one scale 42 below the lens support and the other scale 44 under the image plane. Depending vertically downward from the locating plate at the front or left-hand end of the lens barrel and from the left-hand side of the image plane are pointers 46, 48 respectively, for the precise measurement of the object-to-image-distance and the object-to-the-front-of-the-lens barrel distance indicated as dimension D and $D_1$ on the drawings.

A spring 50 is connected between the lens support and the object plane to maintain tension on the movable lens support and assure its movement toward the object plane, other means such as counterweights could also be used to maintain the desired tension.

Lamps 52 are positioned near the object plane for illuminating it so that an image can be transferred through the lens to the image plane, which in the operating embodiment of this invention was a ground glass.

In order to locate the optical center of the lens the apparatus just described is employed in the following manner. A lens 28 is placed on the V-block 24 having its optical axis disposed normally to the object and image planes and with the left end of the barrel bearing against the right-hand face of the locating plate 26. The object plane is illuminated by lamps 52 and an image is projected through the opening in the locating plate into the lens 28 and then onto the image plane 16. The image plane is marked so that a one-to-one magnification of the object plane can be exactly determined. By utilizing adjustment knob 38 the cable may be reeled in or out on the shaft 40 thereby moving the lens support and its lens until a one-to-one magnification is attained on the image plane. In this step the lens support is positioned without any comparable movement of the image plane.

While the image obtained is the same size as the object it is not necessarily in sharp focus and normally further adjustment is required. However, having achieved the one-to-one magnification the optical center of the lens is equidistantly located from both the object and image planes though the lens barrel may not be equally spaced between the two planes. It should be noted that the optical center may be formed by two spaced points on the axis of a lens which in optics are referred to as nodal points. The term "optical center" as used herein refers to either condition, where the "optical center" is a single point or is comprised of two spaced nodal points. In ray tracing, a ray entering the left nodal point of a lens at some angle will leave the right nodal point at the same angle, as if the two rays were superimposed. In such an arrangement the object-to-image distance is made up of the sum of the distances between the object plane and the left nodal point, the nodal point separation, and between the right nodal point and the image plane.

In bringing the image into its sharpest focus the relative equidistant spacing between the optical center of the lens and the object and image planes must be maintained. This is accomplished by employing the adjustment knob 30 which through the medium of the threaded shaft moves the image plane 16 and concurrently, by way of the cable 34 and pulley 36 device, moves the lens support in the same direction but for only half the distance travelled by the image plane. Because the lens support traverses only half the distance covered by the image plane the optical center of the lens remains equidistantly spaced between the image and object planes. Since a one-to-one magnification is involved it should be appreciated that the cable and pulley arrangement illustrated is particularly adapted to provide the required one-half proportional movement of the lens support in relationship to the movement of the image plane. Other pulley arrangements could be used if a magnification relationship different from one-to-one is employed; for instance if a reduction of a half or an enlargement of twice the size of the object is used when the lens support would have to move either one-third or two-thirds of the distance respectively covered by the image plane. Further, other devices including special threaded or gear ratio means could be utilized in place of the cable and pulley arrangement for attaining the related motion between the lens support and the image plane. In this description the word magnification is intended to cover the projection of the object onto the image plane whether it is the same size as the object, an enlargement or a reduction.

Having brought the image into its sharpest overall focus at a one-to-one magnification the object-to-the-front-of-the-lens barrel and the object-to-the-image plane dimensions are recorded directly from the scales 42, 44. Utilizing these known dimensions the lens can be installed in its intended apparatus and no further adjustments are required regardless of the configuration or position of the individual lenses in the lens barrel.

In addition while it is in the V-block the lens may be rotated to note any shift in the image on its plane, any excessive shift, depending on the use to which the lens will be put, could be the basis for the rejection of the lens. Additionally the resolution may also be checked to ascertain the quality of the image provided by the lens.

As indicated previously the invention is not limited to obtaining a one-to-one magnification ratio, the same general arrangement may be practiced where either a reduced or an enlarged image is desired. It should be noted that it is preferable to check a lens at or close to the magnification at which it is to be used. Further it will be appreciated that means other than those illustrated and described may be used for positioning the lens and image plane, and that the stationary and movable relationship of the object and image planes respectively could be reversed without any change in the invention.

While in accordance with the provisions of the statutes there is illustrated and described herein the best forms and modes of operation of the invention now known to me, those skilled in the art will understand that changes may be made in the form of the apparatus disclosed without departing from the spirit of the invention covered by the claims, and that certain features of the invention may sometimes be used to advantage without a corresponding use of other features.

What is claimed is:
1. A lens testing device comprising:
 (a) object means for supporting an object in an object plane;
 (b) image receiving means positioned in an image plane spaced from and in parallel relationship with said object plane, one of said object means and said image receiving means secured in a stationary position and the other being movable perpendicularly with relation to the plane of the one secured;
 (c) a lens support means aligned between said object means and said image receiving means, said lens support means disposed to support a lens with its optical axis arranged substantially perpendicular to said object means and said image receiving means;
 (d) first adjustment means for moving said lens support means and the movable one of said object means and said image receiving means which includes connecting means between said lens support means and the movable one of said object means and said image receiving means operative upon movement of said movable one to move said lens support means in the same direction as said movable one a distance predetermined to maintain the magnification ratio between said object means and said image receiving means constant; and,
 (e) second adjustment means for adjusting said connecting means so as to move said lens support alone whereby said magnification ratio can be varied.

2. A method for establishing the optical center of a lens in a lens-testing device comprising an object, an image screen and a lens support block and comprising the steps of:
 (a) aligning in serial arrangement the object, the lens support block positioning a lens under test and the image screen according to the focal length of the lens to achieve predetermined magnification;
 (b) moving the lens until an image of the predetermined magnification of the object is achieved on the image screen;
 (c) adjusting the object-to-image distance by moving one of the object and image screen to obtain the optimum focus while concomitantly moving the lens in the same direction as the moving one a distance required to maintain the predetermined magnification of the object on the image screen; and,
 (d) calibrating the relative positions of said object plane, said lens support block and said image screen whereby said optical center is determined.

3. A lens testing device according to claim 1 wherein said movable one is said image receiving means and said connecting means is a two-terminal flexible element connected to said lens support means by a pulley and to said image receiving means by one of its two terminals whereby movement of said image receiving means results in a movement by said lens support means in the same direction one-half the distance.

4. A lens testing device according to claim 3 wherein said one terminal of said two-terminal flexible element is connected to said image receiving means by a winding device adapted to wind up and thereby shorten said element and said second adjustment means comprises said winding device.

5. A lens testing device according to claim 1 further comprising a horizontally elongated base member wherein said object means, said lens support means and said image receiving means are all supported extending vertically from said base member.

6. A lens-testing device as set forth in claim 3 wherein restraining means are attached to said lens support means for maintaining said lens in proper position when it is moved in conjunction with said image receiving means.

References Cited

UNITED STATES PATENTS

| | | |
|---|---|---|
| 1,303,676 | 5/1919 | Jones. |
| 1,793,623 | 2/1931 | Konieczny. |
| 2,506,347 | 5/1950 | Davis. |
| 2,597,168 | 5/1952 | North _____ 88—56 |
| 2,693,736 | 11/1954 | Schumacher. |
| 3,242,800 | 3/1966 | Sanford. |

RONALD L. WIBERT, Primary Examiner

J. ROTHENBERG, Assistant Examiner